(12) United States Patent
Foley et al.

(10) Patent No.: US 6,793,125 B2
(45) Date of Patent: Sep. 21, 2004

(54) SOLDER SHAPING PROCESS AND APPARATUS

(75) Inventors: Paul Foley, Kitchener (CA); Nick Wagner, Dundas (CA)

(73) Assignee: Meikle Automation Inc., Kitchener (CA)

( * ) Notice: Subject to any disclaimer, the term of this patent is extended or adjusted under 35 U.S.C. 154(b) by 0 days.

(21) Appl. No.: 10/195,874

(22) Filed: Jul. 15, 2002

(65) Prior Publication Data

US 2003/0038163 A1 Feb. 27, 2003

(51) Int. Cl.⁷ .................. B23K 1/005; B23K 1/012; B23K 3/00
(52) U.S. Cl. ............. 228/222; 228/102; 228/200; 228/173.1; 228/244; 228/245; 228/19
(58) Field of Search ............... 228/102, 222, 228/223, 200, 207, 234.1, 234.2, 165, 173.1, 173.3, 174, 244–262, 254, 19, 15.1, 8–11, 33, 41; 219/121.63–121.66, 121.73

(56) References Cited

U.S. PATENT DOCUMENTS

| | | | |
|---|---|---|---|
| 3,750,265 A | | 8/1973 | Cushman |
| 3,978,569 A | * | 9/1976 | Cobaugh et al. ............. 29/782 |
| 4,295,596 A | * | 10/1981 | Doten et al. ............ 228/180.21 |
| 4,752,027 A | | 6/1988 | Gschwend |
| 4,997,122 A | * | 3/1991 | Zimmer ..................... 228/165 |
| 5,275,970 A | * | 1/1994 | Itoh et al. .................... 29/845 |
| 5,462,626 A | * | 10/1995 | Kanayama et al. ...... 156/272.8 |
| 5,793,914 A | * | 8/1998 | Sasaki ......................... 385/49 |
| 6,056,184 A | | 5/2000 | Lüchinger et al. |
| 6,119,924 A | * | 9/2000 | Toi et al. ................. 228/179.1 |

* cited by examiner

Primary Examiner—Kiley Stoner
Assistant Examiner—Kevin L. McHenry
(74) Attorney, Agent, or Firm—Pearne & Gordon LLP

(57) ABSTRACT

A process and apparatus for forming fusible solder material mounted on a substrate with the use of a tool having a treatment surface with selected shape. The solder material is heated sufficiently to cause fusing after which the tool is moved such that the treatment surface enters the fused material. The material is allowed to cool to permit re-solidification, after which the treatment surface is withdrawn from the solder, leaving the imprinted shape. The treatment surface is made of material that is not wettable by the solder.

26 Claims, 5 Drawing Sheets

SOLDER SHAPING PROCESS AND APPARATUS

FIELD OF THE INVENTION

The present invention relates in general to the treatment of fusible materials, such as a solder preform, and in particular, to a new and useful process for shaping the surface of solid fusible material to facilitate the attachment of a member requiring precise alignment to a substrate.

BACKGROUND OF THE INVENTION

Traditionally, soldering is a process in which a joint is made between two or more metal parts. The metal solder which is used to form a solder joint, must, in its liquid state, form inter-metallic phases with the material of the metal parts. In some cases, it proves advantageous to place solid solder material on a surface, or substrate, and lay the parts to be joined onto the solder, and subsequently join them. This serves to join the two members as well as to fix the joint to the substrate. The greatest issue in any joining process is the positioning of the parts before and after they are joined. To ensure proper positioning of the parts, a groove or track in the surface of the solid solder would be used to prevent the part from changing orientation during the fusing process. The forming of this track is now the most important part of the entire soldering process and the groove ensures a particular spatial orientation of the part, for example, the distance between the part and the substrate. In applications such as optical fiber attachments, this distance is critical to the performance of the end product.

There are a few methods of shaping the surface of the solder. They are based on a forming shape being pressed against and removed from the solder surface, leaving the desired shape for the particular application. U.S. Pat. Nos. 3,750,265 and 4,752,027 both use rollers as a method of forming the shape in the surface of solder. The former uses rollers with protrusions along the circumferences to create depressions in a strip of solder wire, while the latter uses rollers to flatten the surfaces of solder bumps on a printed circuit board. U.S. Pat. No. 4,997,122 uses a heated tool to pierce the surface of the solder to fuse it and subsequently withdraw the tool, leaving a permanent shape in the solder.

SUMMARY OF THE INVENTION

This invention solves the issue of creating a track in a solid solder material to aid in reducing physical interferences during the process of accurate positioning of a part for use in a fiber optic alignment and attachment application. The solder material, a preform, is laid onto a substrate material. The preform is subjected to heat energy sufficient to cause fusing, forming a solder globule.

A tool, with a treatment surface with a desired shape and at a temperature below that of the fusing point of the preform, is maneuvered such that the treatment surface penetrates the fused preform. The preform is allowed to cool and solidify and the treatment surface withdrawn from the surface of the preform, leaving an impression with the desired shape in the preform surface. The entire process occurs in a chemically reducing atmosphere, known as a cover gas, to prevent the formation of oxide layers during the fusing process. The cover gas is preferred to liquid flux since, in this application, there can be no residue from the solder process. The heat energy may be in the form of radiated infrared energy, resistive energy, or heat transfer from a hot gas.

For most applications it is not easy to control the shape of the formed solder, so an object of the present invention is a mold that is used to contain the solder to a region defined by the extends of the mold, which are typically similar to the projected size of the solder pad upon which the solder is fused. The mold tool is applied to the solder region using an automatic actuator before the solder is liquefied. After the mold tool is in place the forming process commences as per the following described preferred embodiment of the invention.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention is described below by reference to the following drawings.

DESCRIPTION OF THE PRESENTLY PREFERRED EMBODIMENTS

Figure 1:
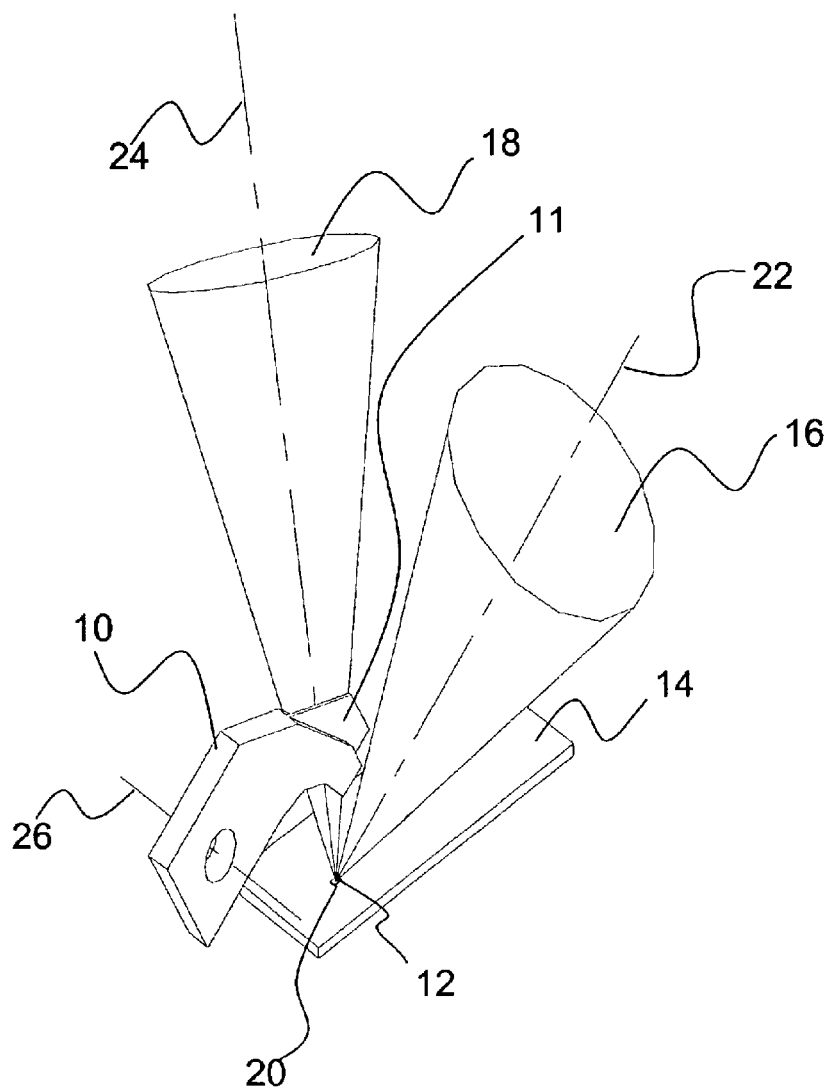
FIG. 1 is a perspective view of an apparatus used to practice the present invention.
Figure 2:
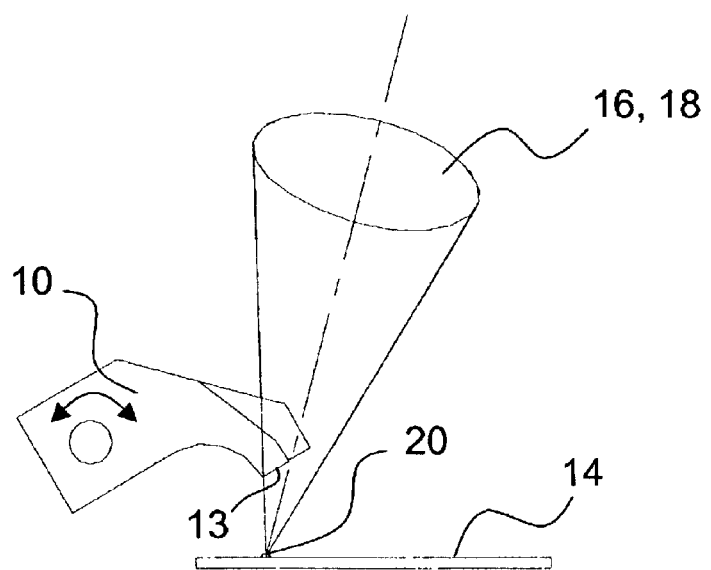
FIG. 2 is a section view of a process phase.

The apparatus according to FIG. 1 comprises a forming tool 10 having a supporting body and a blade 11. The forming tool 10 can rotate about a shaft (not shown), which is coaxial with an axis 26, by means of an actuator (not shown). A solder preform 20 that is resting on a solder pad 12 is subjected to laser energy via focused laser beams 16, 18 directed along optical axes 22 and 24 respectively and focused at the height of the solder preform 20. The laser beams are delivered through focusing optics (not shown) from a high power laser (not shown). The solder pad 12 can be described as being plated onto a substrate 14 and having been made of a compatible metal to that of the solder preform 20 so as to allow wetting of the solder 12 to the solder pad 20 when the solder 20 is in the molten state (FIG. 2).

Figure 4:
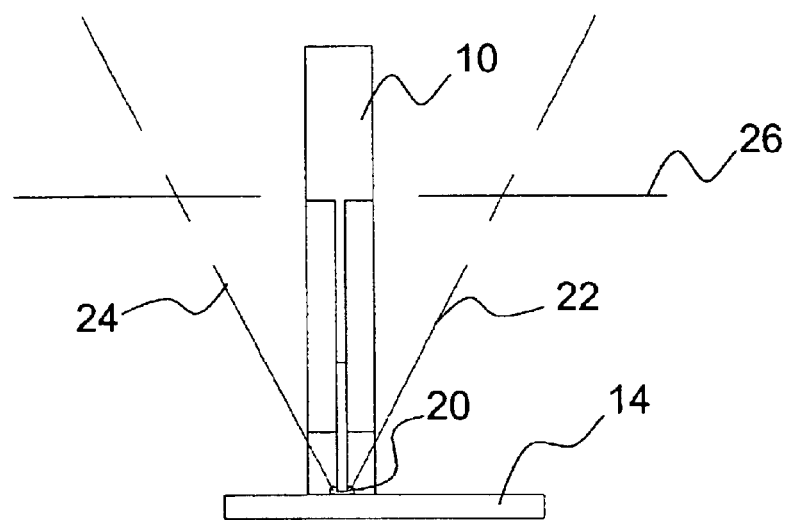
FIG. 4 is an alternate view of the process phase shown in FIG. 3.

The axes 22, 24 of the focused laser beams 16, 18 are positioned to optimize the amount of energy applied to the formed solder 20 (FIG. 4). Once the solder 20 is molten according to FIG. 2 the actuator (not shown), which rotates the forming blade 10 as indicated by the arrow, is activated in order to rotate the forming blade 10 toward the solder 20. The version of apparatus according to FIG. 1 entails a stopping surface 13 (FIG. 2) on the forming tool 10 that contacts the substrate 14 to complete the forming process.

Figure 3:
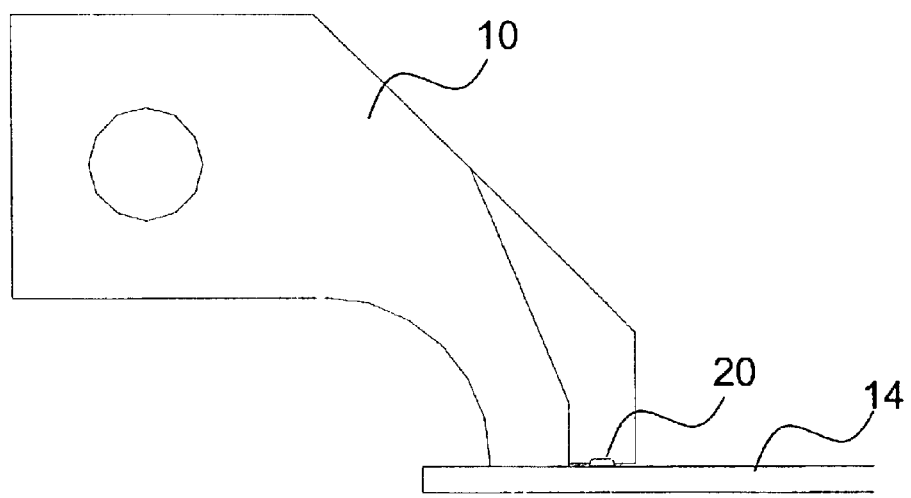
FIG. 3 is a section view of a process after the laser has been deactivated.

The stopping surface 13 of the forming tool 10 contacts the substrate 14 according to FIG. 3 and the blade 11 enters the molten solder 20 to form a shape in the solder in accordance with the shape of the blade 11. It should be mentioned here that the shape of the molten solder 20 depicted in FIG. 3 is not entirely representative of actuality because the top surface of the solder is not flat as shown but is more rounded.

In FIG. 4 is a sectional view of the apparatus according to FIG. 1 at the process phase given in FIG. 3 indicating the position of the optical axes 22, 24 of the focused laser beams 16, 18 (FIG. 1) relative to the solder 20. In addition FIG. 4 shows an example of a formed solder profile 20 with the forming tool 10 in the forming position. The forming tool remains in this position until the formed solder 20 is sufficiently solidified.

Figure 5:
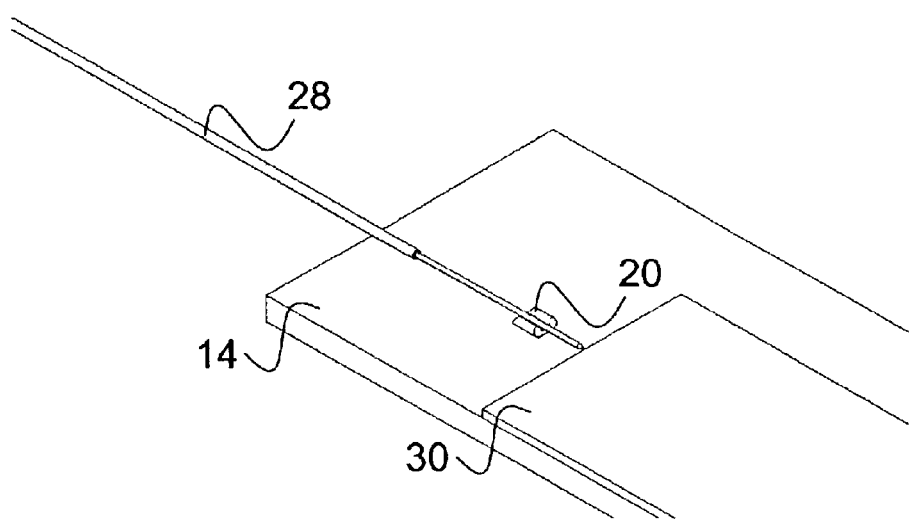
FIG. 5 is a section view illustrating the extended embodiment of a process.
Figure 7:
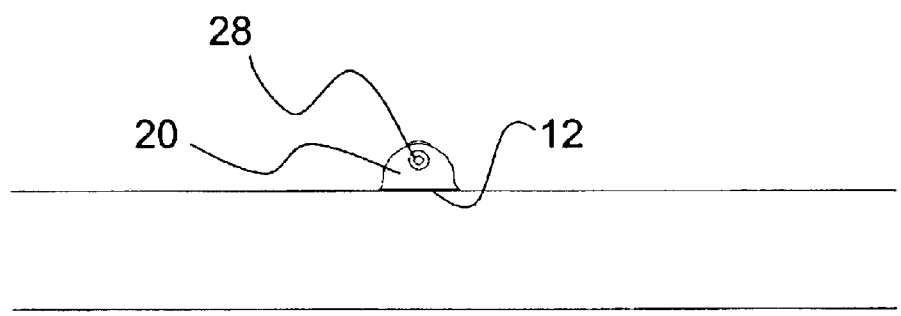
FIG. 7 is a section view of a later stage of the process illustrated in FIG. 6.

An example usage of the formed solder produced by the apparatus of FIG. 1 and the process indicated by FIGS. 2 and 3 is shown in FIG. 5. An optical fiber 28 is held by a precision alignment device (not shown) and is optically aligned to a device 30 during which time it may be within the physical limits of the formed solder 20. The fiber 28 having a portion of its length closest to the device 30 from which the jacket has been removed and the glass fiber has been treated with a surface coating of a metal that can be wetted by the liquid solder 20 (FIG. 7).

Figure 6:
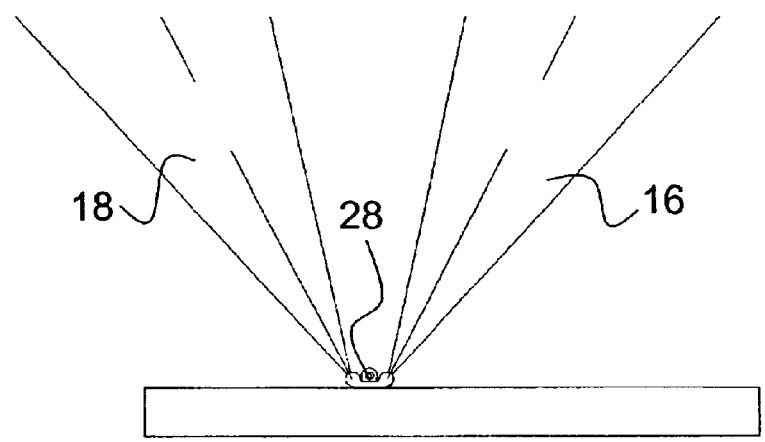
FIG. 6 is a section view of a process phase showing a fiber in the formed solder.
Figure 8:
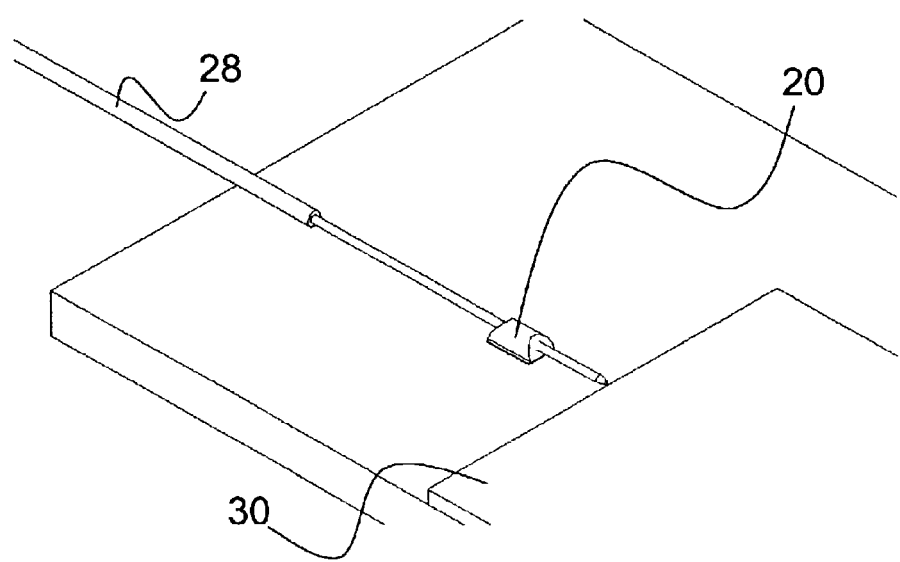
FIG. 8 is a perspective view of a fiber shown captivated in re-flown solder.

According to FIG. 6 the solder 20 is now subjected to laser energy from two focused laser beams 22, 24 directed along optical axes 16, 18 toward the two larger volumes of solder 20 on either side of the fiber. The position of the optical axes 16, 18 is critical to the success of the fiber attachment process referenced by FIGS. 5 to 7. Minimizing the radiation energy absorbed by the fiber 28 from the focused laser beams 22, 24 reduces the risk of damaging the optical fiber 28. The solder 20 melts and wets the surface of the fiber 28 then the laser energy is ramped down until it is completely removed at which time the solder 20 solidifies according to FIG. 7 and a portion of the surface treated section of the fiber 28 is held rigidly within the solder globule 20. A feature identified in FIG. 1 as the solder pad 12 is shown at a greater scale in FIG. 7. In FIG. 8 a perspective view is given of an example result from the fiber attachment process referenced in FIGS. 5 to 7.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A process for forming fusible solder material, that is supported on a substrate, using a tool having a treatment surface with a selected shape after having applied energy to the solder material to heat the solder to a temperature sufficiently high to fuse the solder, the process comprising the steps of:
    moving the forming tool in a selected direction toward the substrate and into contact with the solder material to form the solder into a selected shape;
    the moving continuing until a required gap has been reached between the tool and substrate;
    allowing the fusible solder material to cool sufficiently to resolidify while the tool is in contact with the fusible material;
    and thereafter withdrawing the tool from the surface of the fusible material; said tool kept at a temperature below a temperature equal to a natural fusing temperature of the solder material.

2. A process according to claim 1, wherein the energy to fuse the solder is emitted from a radiant energy source.

3. A process according to claim 1, wherein the heat energy is supplied by a current passing through one resistor.

4. A process according to claim 1, wherein the heat energy is supplied by a current passing through a plurality of resistors.

5. A process according to claim 1, wherein the heat energy is supplied by a flow of hot gas.

6. A process according to claim 1, including heating the fusible material after moving the treatment surface into contact with the fusible material.

7. A process according to claim 1, wherein the treatment surface of the forming tool includes at least one convex projection so that a cavity is formed in the surface of the fusible material.

8. A process according to claim 7, wherein the convex projection comprises a ridge so that the cavity is in the form of a groove.

9. A process according to claim 7, wherein the treatment surface includes a plurality of spaced convex projections for forming a plurality of cavities having same depths, the cavities being separated from each other.

10. A process according to claim 7, wherein the treatment surface includes a plurality of spaced convex projections for forming a plurality of cavities having different depths, the cavities being separated from each other.

11. A process according to claim 7, wherein the treatment surface includes one concave recess for producing a convex shape in the surface of the fusible material.

12. A process according to claim 7, wherein the treatment surface includes a plurality of concave recesses for producing convex shapes in the surface of the fusible material.

13. A process according to claim 1, wherein a flow of protective gas is directed toward the fusible material before, during and after it has fused to save the fusible material from oxidation during the process.

14. A process according to claim 1, wherein a flux material is applied to the fusible solder material to aid fusion and to protect the material from oxidation during process.

15. A process according to claim 1, wherein the entire process is automated as such requiring no human intervention.

16. A solder shaping process according to claim 1, further comprising the steps of:
    placing a part in a groove of the formed solder; and
    applying heat energy to the formed solder by a radiant energy source to cause molten solder to wet a surface of the part, whereby solidification of the solder creates a solid attachment between the part and the substrate.

17. A process according to claim 16, wherein the heat energy applied to the formed solder is supplied by two radiant energy sources aimed at opposite sides of the part, whereby each radiant beam is targeted at one of two peaks of the solder material that were created in the shaping process.

18. A solder shaping process according to claim 1, further comprising the steps of:
    placing a part in a groove of the formed solder; and
    applying heat energy to the formed solder by a hot gas source to cause molten solder to wet a surface of the part, whereby solidification of the solder creates a solid attachment between the part and the substrate.

19. A solder shaping process according to claim 1, further comprising moving an optical fiber within a groove formed in the solder material by the solder shaping process, to obtain alignment to a device, after which heat energy is applied to the formed solder by a radiant energy source to secure the fiber in an aligned position.

20. A process according to claim 19, wherein the heat energy applied to the formed solder is supplied by two radiant energy sources aimed at opposite acute angles to a vertical plane passing near a horizontal center of the fiber, whereby each radiant beam is focused and targeted at one of two peaks of the solder material that were created in the shaping process.

21. A solder shaping process according to claim 1, further comprising moving an optical fiber within a groove formed in the solder material by the solder shaping process, to obtain alignment to a device, after which heat energy is applied to the formed solder by a hot gas source to secure the fiber in an aligned position.

22. A process for forming fusible solder material, that is supported on a substrate, using a mold having a desired shape and a tool having a treatment surface with a selected shape, the process comprising the steps of:

moving the mold toward the substrate into contact with the a substrate surface and placed in location according to a location of a solder pad and solder pre-form on the substrate;

applying energy to the solder pre-form to heat the solder to a temperature sufficiently high to fuse the solder;

moving the forming tool in a selected direction toward the substrate and into contact with the solder material to form the solder into a selected shape;

the moving continuing until a required gap has been reached between the tool and substrate;

allowing the fusible solder material to cool sufficiently to resolidify while the tool is in contact with the fusible material;

and thereafter withdrawing the tool from the surface of the fusible material and withdrawing the mold from the surface of the substrate;

said tool kept at a temperature below a temperature equal to a natural fusing temperature of the solder material.

23. A process according to claim 22, wherein the energy to fuse the solder is emitted from a radiant energy source.

24. A process according to claim 22, wherein the heat energy is supplied by a current passing through one resistor.

25. A process according to claim 22, wherein the heat energy is supplied by a current passing through a plurality of resistors.

26. A process according to claim 22, wherein the heat energy is supplied by a flow of hot gas.

* * * * *